W. SPRAGUE.
FRICTION DRIVING MECHANISM.
APPLICATION FILED JULY 1, 1909.

1,000,632.

Patented Aug. 15, 1911.
2 SHEETS—SHEET 1.

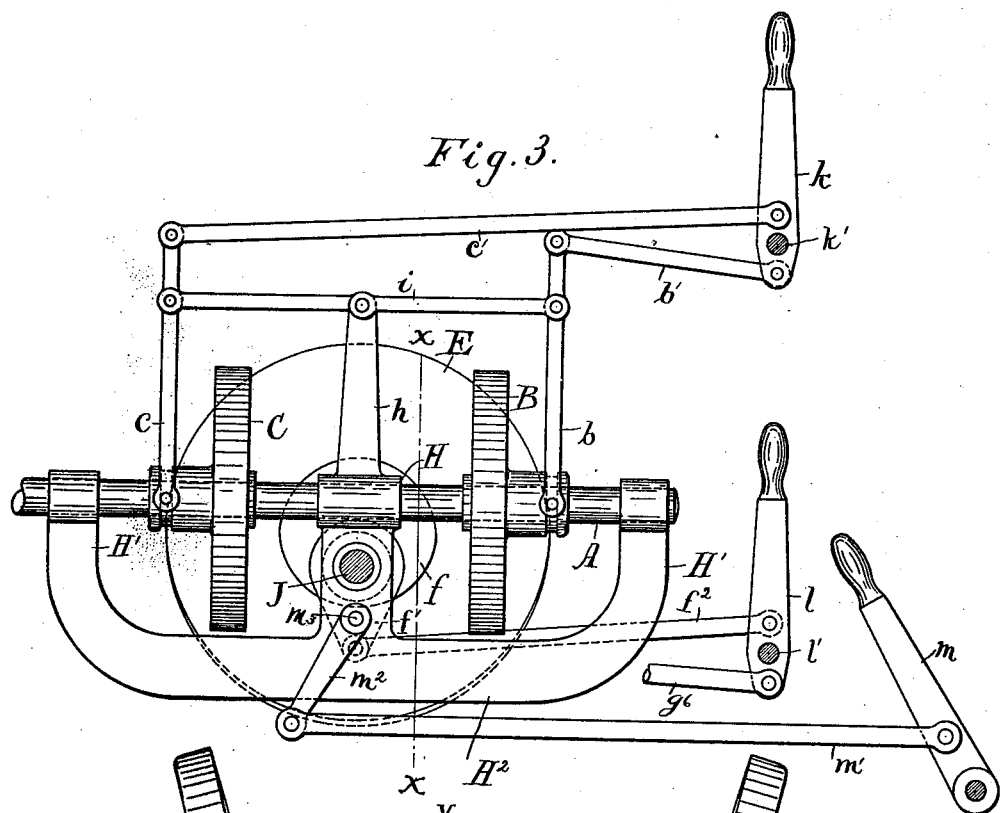
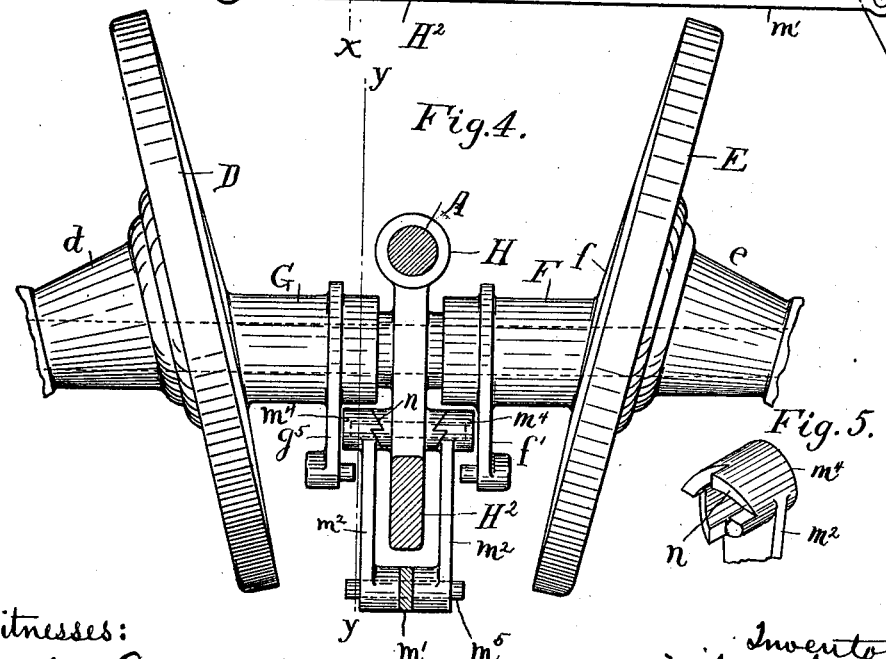
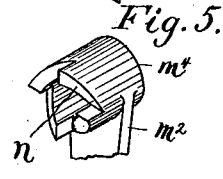

UNITED STATES PATENT OFFICE.

WILSON SPRAGUE, OF PORTLAND, MAINE.

FRICTION DRIVING MECHANISM.

1,000,632.  Specification of Letters Patent.  Patented Aug. 15, 1911.

Application filed July 1, 1909. Serial No. 505,365.

*To all whom it may concern:*

Be it known that I, WILSON SPRAGUE, a citizen of the United States of America, and a resident of Portland, in the county of Cumberland, State of Maine, have invented certain new and useful Improvements in Friction Driving Mechanism, of which the following is a specification.

My invention relates to a friction driving gearing and it is primarily designed to be used in motor vehicles although it is adapted to be used for transmitting power in many other forms of mechanism.

The class of driving gearing to which my invention relates includes devices which are used for reversing the direction of motion of the motor vehicle and for varying its speed and the objects of my invention are to provide;—1—A compact transmitting and driving unit with all strains balanced and self contained and easily attached to a vehicle. 2—A constant speed of the driving faces in contact, or the frictional transmitting surfaces to have the same linear or surface velocity at all points of change speed position. 3—A double point of friction contact making it possible to use twice the width of frictional faces in contact without the losses that occur in a comparatively broad faced gear. 4—Two pairs of friction gears, one pair for each of the driving wheels of the vehicle and both in engagement at the same time. 5—A simple and easy method of changing the speed of the vehicle or "gaining power" so called, by maintaining a constant rate of revolution of the motor shaft, but changing at will the ratio of revolution that exists between the driver and the driven. 6—A simple and effective means of reversal of the motion of the vehicle, ahead or back. 7—A simple and convenient method of throwing the gears out of contact for stopping the vehicle or throwing out of gear without stopping the motor. 8—A device simple in construction, of few and substantial parts and easy to apply the controlling connection. These objects I accomplish by means of the mechanism hereinafter shown and claimed.

I have illustrated my invention in the accompanying drawing in which is shown the preferable form of my device although it is to be understood that it is capable of being constructed in many other forms while retaining the essential features of my invention.

Figure 1:
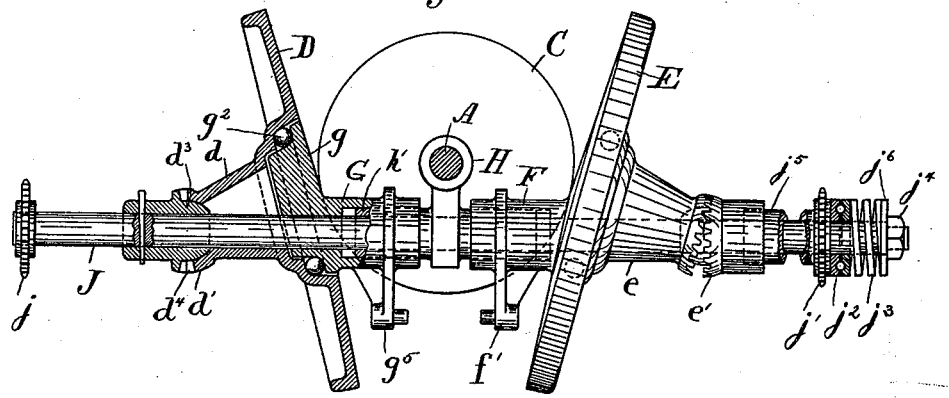
Figure 2:
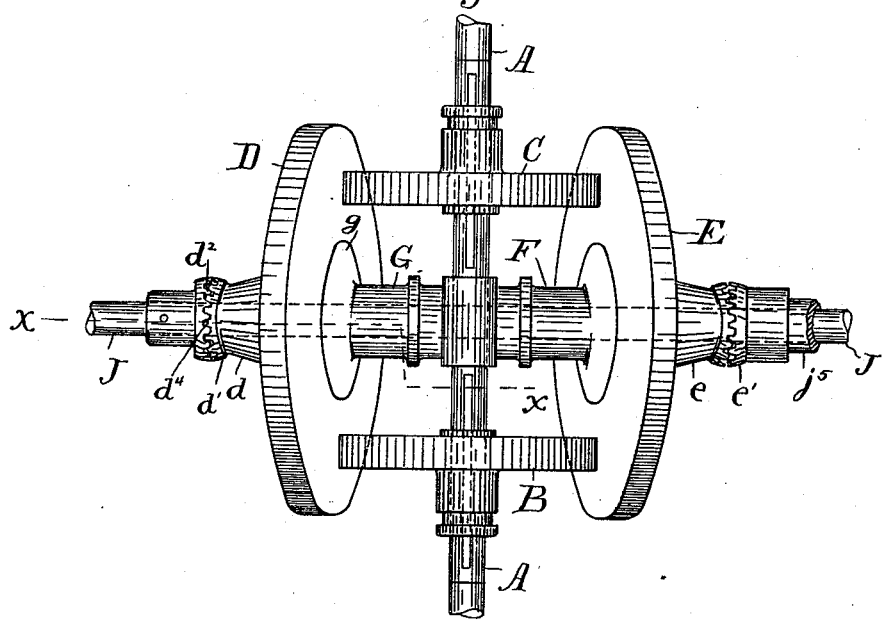

In the drawing, Figure 1 is a part section taken on the line $x$ $x$ of Fig. 2 and Fig. 2 is a plan showing the principal parts used in transmission but with controlling devices omitted, Fig. 3 is a side elevation of the device showing controlling devices and with counter shaft cut on the line $y$ $y$ of Fig. 4 and the left hand disk removed, Fig. 4 is an end elevation with the driving shaft cut on the line $x$ $x$ of Fig. 3 and both friction driving wheels and the controlling devices removed, and Fig. 5 is a detail of a portion of the controlling mechanism.

In the drawing, A represents the main motor or driving shaft from which power is to be transmitted to the wheels of the motor vehicle. The shaft A is journaled in a suitable frame or support here shown as having a horizontal member $H^2$ below the shaft with a standard $H'$ at each end and a like standard H in the center each of these standards having a bearing in which the shaft is journaled. The frame $H^2$ is suitably secured to the frame of the motor vehicle by means not here shown.

Located on the shaft A are a pair of friction gears or wheels B and C. These wheels have friction edges or perimeters and they are splined to the shaft in the well known manner so as to have a longitudinal movement thereon. Means are provided for sliding the friction wheels B and C simultaneously from and toward each other on the shaft A and as here shown I use for this purpose two yoke levers $b$ and $c$ connecting respectively with the grooved hub on the wheels B and C in the ordinary manner. Each of the levers $b$ and $c$ is pivoted at some point between its ends to the end of a horizontal arm $i$, this latter being pivoted centrally to the upper end of a standard $h$ which forms an upward extension of the standard H.

The levers $b$ and $c$ are connected with a controlling lever $k$ by two links $b'$ and $c'$ one being pivoted on each side of the pivotal center $k'$ of the lever $k$. Thus a movement of the lever $k$ on its center tends to slide the wheels B and C simultaneously from and toward each other along the shaft A.

The driven shaft or counter shaft J which takes its motion from the driving shaft and transmits it to the wheels is journaled as here shown at right angles to the shaft A and beneath the same. It is represented here as being journaled centrally in a bearing formed in the standard H of the frame and projecting from each end of this bearing there is a tubular extension $h'$ the function of which will be hereinafter explained. The ends of the shaft J may be journaled in suitable bearings located in the frame of the machine and not here shown.

The power from the friction wheels B and C is transmitted to the counter shaft by means of two disks D and E, one on each side of the wheels and adjacent to their friction edges. The face of each of the disks is inclined back from the perpendicular and its axis makes an acute angle with the axis of the counter shaft J. Each disk is adapted by means hereinafter shown to contact simultaneously with opposite friction wheels and at opposite sides of the disk centers thereby forming two driving pairs tending to turn the counter shaft in the same direction.

Means are provided for transmitting the motion of each of the driven disks E and D to its shaft and for this purpose I make use of a suitable universal joint. As herein shown each disk has extending from its rear side a hollow hub or sleeve preferably conical in form being larger in diameter where it joins the disk than at its rear end where it connects with the shaft. Considering the disk D and its hub $d$, the rear end of the hub $d$ forms the outer member or socket $d'$ of a ball and socket joint having short and coarse gear teeth $d^4$ formed on the edge of the socket. The inner or ball member of the joint is formed of a hub $d^3$ secured on the shaft and having a spherical surface which fits the socket $d'$ of the hub $d$ to form the joint. Surrounding the spherical surface of the hub $d^3$ there are gear teeth $d^2$ which engage the gear teeth on socket $d'$. The axis of the hub $d$ and of the disk is coincident with the center of the spherical surface of the ball and socket joint so that the disk will rotate truly on its axis and the gears will always be on the upper side in proper engagement. The shaft J extends through the hollow hub and as here shown it is substantially in contact and parallel with the lower portion of the hollow hub. A bearing is provided for the disk whereby the same may rotate freely on its axis. For this purpose I provide a bearing supporting the disk at the point where it connects with its hub, this bearing being supported by the fixed frame.

As here shown the rotation of the disk D on its axle is effected by means of a ball bearing cone $g$ inserted in the inner end of the hollow hub $d$ with antifriction balls $g^2$ interposed between the cone $g$ and the inner surface of the hub, the adjacent surfaces being suitably formed to produce a ball bearing.

The lower portion of the cone $g$ is formed into a sleeve G which extends inward and embraces the tubular portion of the journal bearing $h'$ of the shaft J as before described, so that the sleeve G and the cone $g$ are held in a fixed position except that the sleeve G may be rotated to a small extent on the tubular portion $h'$ as hereinafter shown.

Means are provided for transmitting power from the shaft J and as here shown the shaft is provided with a sprocket wheel $j$ by which power may be transmitted to one of the wheels.

The flare of the hub $d$ is governed by the inclination of the disk axis to the axis of the shaft J and it is flared just enough so that it will allow the shaft to pass through. On the other hand the inclination of the disk is governed by the vertical distances between the shafts A and J since the axis of the disk continued should pass through the shaft A. When the disks are in their normal or central position the plane of their faces, assuming them to be perfectly flat, intersect in a line parallel to and below the axis of the driving shaft, each disk being slightly out of contact with the wheels C and B so that no contact takes place and no power is transmitted.

The disk E and its adjacent parts is similar in construction to the disk D as described, F being the sleeve supporting the cone bearing, $e$ the hollow conical hub and $e'$ the spherical hub or ball member engaging the socket member on the end of the hollow hub $e$.

Means are provided for giving the disk E a slight sliding motion along the shaft J and for transmitting the rotary motion of the disk E to the driving wheel independently of the opposite disk D. For this purpose instead of securing the spherical sleeve $e'$ on the shaft J, it is secured on the inner end of a hollow shaft $j^5$ which fits over the shaft J and is adapted to turn thereon. On the outer end of the shaft $j^5$ is secured the sprocket wheel $j'$ and a tension spring $j^3$ acting against a thrust bearing $j^2$ and a washer $j^6$ tends to thrust the disk E into contact with the edges of the friction wheels C and B and also to pull the disk D into like contact.

A nut $j^4$ on the end of the shaft J holds the washer in and serves to adjust the tension on the disks.

Means are provided for bringing each of the disks simultaneously into contact with the opposite friction wheels to produce a similar rotation of the shafts J and $j^5$ in the same direction and for this purpose I provide for rocking the disks slightly in opposite directions on the axis of the shaft J. As here shown, this movement is produced by rotating the sleeves G and F on their tubular bearings $h'$ by which the lower portions of the disks are slightly raised and the face of each disk swung against the friction edge of one of the wheels B C. This result takes place because the lower portion of each disk is horizontally nearer the shaft A than the upper portion and because the rotation is in a vertical plane being on a horizontal axis. To produce the rocking motion described suitable controlling mechanism is provided, the latter being conveniently located where it can be reached by the driver of the vehicle. The mechanism herein shown is used to illustrate in a general way how the control may be effected. As here shown, the rotation is produced by means of a hand lever $l$ pivoted at $l'$ having two links $f^2$ and $g^6$ pivoted to it, one on each side of the pivotal center.

The link $f^2$ is pivoted to the lower end of an arm $f'$ formed on the sleeve F and the link $g^6$ connects with the lower end of an arm $g^5$ on the sleeve G (Fig. 4). When the lever $l$ is moved the two links swing the arms $g^5$ and $f'$ in opposite directions causing the disks to rock, bringing one in contact with the wheel B and the other in contact with the wheel C. By moving the lever $l$ in the opposite direction the disks are rocked in the opposite direction and each brought into contact with the other friction wheel thus changing the direction of rotation of the shafts J and $j^5$. Hand controlled means are provided for slightly spreading the disks to hold them out of contact with the wheels when the latter are to be moved along the shaft A from or toward the center. For this purpose, as herein shown, I provide a pair of levers $m^2$, one on each side of the horizontal member $H^2$ of the frame and united at their lower ends by a pin $m^5$. On the upper end of each lever is formed a hub $m^4$ having on its inner face cam surfaces $n$ which engage corresponding surfaces formed on the frame of the machine. The hub of each lever is pivoted on a pin $m^3$ (Fig. 3) and the conformation of the engaging cam surfaces is such that when the hubs are rotated on the pin the former will be forced outward and caused to strike against the arms $g^5$ and $f'$ thus forcing the sleeves F and G and the two disks slightly apart against the action of the tension spring, freeing the disks from contact with the friction wheels. A link $m'$ connects the lower ends of the arms $m^2$ with the operating lever $m$.

I have specified the members D and E as "disks" and for all practical purposes they are annular disks but the faces of the disks are made slightly conical so that the radial line which the edge of the wheel contacts with will be parallel with the axis of the shaft A. If the contact of the disk and wheels is made when the disks are in their central position that is, when a plane passed through the disk axis and the disk shaft is vertical, then the disk face would be a plane and a radial line drawn from the point of contact with the wheel would be parallel with the axis of the shaft A and the wheel would touch the disk in all positions. When, however, the disk is rocked on the axis of its shaft until it contacts at a radial line which is level or parallel with the shaft A the line at the edge of the disk is nearer the shaft A than when the disk is in its normal position and a continuation of this line parallel with the shaft A will bring it inside or beyond the face of the disk, that is, the face of the disk will be a flat cone.

The operation of my device is evident from what has been said regarding its construction.

Assuming that the machine is at rest, the lever $m$ pulled forward turning the hubs $m^4$ and forcing the disks apart and out of contact with the wheels. The lever $k$ is now adjusted so as to bring the wheels C and B at the outer position near the edges of the disks for the slow speed or at the inner position nearer the center for the high speed or at any intermediate point as desired. The lever $l$ is now thrown to one of its extreme positions, rocking the disks in opposite direction into position to contact one with each of the wheels for the forward or reverse motion as the case may be. The lever $m$ is then released and the force of the spring $j^3$ is allowed to force the disks toward each other until they contact with the edges of the wheels C and B, the cam surfaces $n$ acting to force the arms $m^2$ to their normal position when the lever $m$ is released. In reversing, when the machine is in operation it is not necessary to use the lever $m$ to disconnect the disks from the wheels as the disks can be simply rocked and the contacts changed from the forward to the reverse position or vice versa as desired but when a change of speed is desired, the lever $m$ must first separate the disks and then the wheels are moved into their new positions and released. It will thus be seen that two driving pairs are at all times acting and the tension of the spring in forcing one pair into contact is resisted by the other pair so that the strain is balanced within the friction gearing and is not transmitted to any fixed portion of the machine. By having two driving wheels both acting to turn the driven shaft in the same direction the faces of the wheels may be made narrower than when a single driving pair is employed with a relatively broad face and there is less lateral slip due to the different distances from the disk center to the edges of the wheel.

It will be seen that the surface velocities of the friction faces are the same both in low and high speed, this being an advantage over the ordinary construction of friction gears wherein the lowest velocities of the frictional parts are at the low speed position.

Among the important advantages of my construction is the fact that both the driving and the driven shafts may be made continuous as here shown since they cross each other at different levels. This is made possible by the inclined position of the disk and the fact that their axes make an angle with the counter shaft.

It is evident that the sprocket wheel $j'$ may be secured to the shaft J instead of to the sleeve and the sleeve splined or otherwise secured to the shaft in which case the shaft J would receive directly the power from both disks.

If desired the usual differential gearing may be omitted from the driven axle of the car and one or the other of the disks allowed to slip in its contact with its wheel as one of the carriage wheels rolls ahead or is retarded in going around corners or a slipping frictional connection may be interposed at some other point. It is evident that power may be applied from the shaft J through the disks to the friction wheels although such an arrangement would lack some of the advantages of the arrangements above described.

The ball cone $g$ may be dispensed with and any suitable form of bearing inserted to sustain the inner end of the disk axis and to provide a journal therefor but some form of anti-friction bearing is desirable on account of its large diameter.

The shafts A and J are shown as being continuous but either shaft may be in sections if desired or each shaft may be hollow and adapted to fit over a solid central shaft.

I claim:—

1. In a friction transmission gearing the combination of a friction wheel and a friction disk the face of which is adapted to contact with the perimeter of said wheel, a shaft for said disk set at an angle with the axis of the disk and a universal joint between the disk and shaft.

2. In a friction transmission gearing, the combination of a pair of friction disks and a pair of friction wheels interposed between them and adapted to contact with the disk faces, the plane of the disk faces being set at an angle with each other and when in their normal or central position intersecting in a line parallel with the axis of said wheels and means for bringing each wheel into contact with opposite disks.

3. In a friction transmission gearing the combination of a pair of opposed friction disks, a pair of friction wheels between the disks on a fixed common axis and means to bring the two wheels simultaneously into contact with opposite disks and at opposite sides of the disk axes.

4. In a friction transmission gearing, the combination of a pair of opposed friction disks, a pair of friction wheels between said disks on a common axis, a shaft for each disk, set at an angle with the disk axis, a universal joint connecting the disks and shafts and means for bringing the wheels simultaneously into contact with opposite disks and at opposite sides of the disk axes.

5. In a friction transmission gearing, the combination of a pair of opposed friction disks, a pair of friction wheels between said disks on a common axis, a shaft for each disk set at an angle with the disk axis, a universal joint connecting the shaft and disk and means for moving the disk axes to bring opposite disks in contact with opposite wheels and at opposite sides of the disk axes.

6. In a friction transmission gearing, the combination of a pair of friction wheels on a common axis, a pair of opposed friction disks one at each side of said wheels, and set in planes which intersect in a line parallel with the wheel axis when said disks are in their normal or central position and means for causing opposite wheels to contact opposite disks and at opposite sides of the disk axes.

7. In a friction transmission gearing, the combination of a pair of friction wheels on a common axis, a pair of opposed friction disks one on each side of said wheels and set normally in a plane which intersects in a line parallel with the wheel axis and means for rocking said disks to bring opposite wheels simultaneously into contact with opposite disks and at opposite sides of the disk centers.

8. In a friction transmission gearing, the combination of a pair of friction wheels, a shaft on which they are mounted, a pair of opposed friction disks, one on each side of said wheels, a shaft for each of said disks making an angle with the disk axis, a universal joint connecting each disk and its shaft and means for rocking each disk about its shaft axis to bring opposite disks in contact with opposite wheels.

9. In a friction transmission gearing, the combination of a pair of friction wheels, said wheels being mounted on a common axis, a pair of opposed friction disks, one on each side of said wheels, a shaft for each of said disks making an angle with its disk axis, a universal joint connecting the disk and shaft, means for rocking each disk about its shaft axis to bring opposite disks in contact with opposite wheels and means for sliding said wheels longitudinally on the common axis.

10. In a friction transmission gearing, the combination of a pair of friction wheels, a common shaft on which said wheels are mounted, a pair of opposed friction disks, one on each side of said wheels, a shaft for each of said disks making an angle with its disk axis, a universal joint connecting the disk and shaft, means for rocking each disk about its shaft axis to bring opposite disks in contact with opposite wheels and means for sliding said wheels longitudinally on the common shaft.

11. In a friction transmission gearing, the combination of a pair of frictional driving wheels on a common axis, a pair of friction disks one on each side of said wheels and adapted to contact therewith, a shaft for each of said disks having a common axis of rotation which crosses the wheel axis without intersecting it, the axis of each of said disks making an angle with the axis of rotation of said shafts and a universal joint connecting each disk with its shaft.

12. In a friction transmission gearing, the combination of a driving shaft, a pair of friction wheels on said shaft, a pair of friction disks, one on each side of said wheels and adapted to contact therewith, a shaft for each of said disks having a common axis of rotation which crosses said driving shaft without intersecting it, the axis of each of said disks making an angle with the axis of rotation of said shafts and a universal joint connecting each disk with its shaft.

13. In a friction transmission gearing, the combination of a friction wheel, a friction disk having a hub and adapted to contact with said wheel, a disk shaft making an angle with the axis of said friction disk, and a universal joint connecting the end of said hub with said shaft.

14. In a friction transmission gearing, the combination of a friction wheel, a friction disk having a hub and adapted to contact with said wheel, a disk shaft making an angle with the axis of said friction disk, a ball and socket joint connecting the end of said hub with said shaft and engaging means surrounding said joint to prevent the lateral slipping of said joint.

15. In a friction transmission gearing, the combination of a friction wheel, a friction disk having a hub and adapted to contact with said wheel, a disk shaft making an angle with the axis of said disk, a ball member and a socket member constituting a ball and socket joint, one member being on said hub and the other member on said shaft and interlocking gear teeth surrounding said ball member and in the edge of said socket member.

16. In a friction transmission gearing, the combination of a friction wheel, a friction disk having a hollow hub and adapted to contact with said wheel, a disk shaft extending through said hollow hub making an angle with the axis of said disk and a universal joint connecting said shaft and hub.

17. In a friction transmission gearing, the combination of a friction wheel, a friction disk having a hollow hub with a spherical socket in its end and adapted to contact with said wheel, gear teeth being formed on the edge of said socket, and a ball member on said shaft adapted to fit into said socket to form a ball and socket joint, gear teeth being formed on the outside of said ball member adapted to engage the teeth on the socket.

18. In a friction transmission gearing, the combination of a friction wheel, a friction disk having a hollow conical hub having a spherical socket in its end and adapted to contact with said wheel, gear teeth being formed on the edge of said socket, and a ball member on said shaft adapted to fit into said socket to form a ball and socket joint, gear teeth being formed on the outside of said ball member adapted to engage the teeth on the socket.

19. In a friction transmission gearing, the combination of a friction wheel, an annular friction disk adapted to contact with said wheel, said disk having a hollow hub, a disk shaft extending through said hub and making an angle with the disk axis, a universal joint connecting the end of the hub with the disk shaft, a bearing cone fitting the central disk opening to form a journal bearing therefor, a sleeve connected with said cone and surrounding the disk shaft and means for rotating said sleeve.

20. In a friction transmission gearing, the combination of a friction wheel, an annular friction disk adapted to contact with said wheel, said disk having a hollow hub, a disk shaft extending through said hub and making an angle with the disk, a universal joint connecting the end of the hub with the disk shaft, a bearing cone fitting the central disk opening to form a pivoting bearing therefor, a sleeve connected with said cone and surrounding the disk shaft, a fixed tubular bearing for said sleeve and means for rotating said sleeve.

21. In a friction transmission gearing, the combination of a friction wheel, an annular friction disk adapted to contact with said wheel, said disk having a hollow hub, a disk shaft extending through said hub and making an angle with the disk axis, a universal joint connecting the end of the hub with the disk shaft, a ball bearing cone fitting the central disk opening, antifriction balls for said cone making a ball bearing connection, a sleeve connected with said cone and surrounding the disk shaft, a fixed tubular bearing for said shaft and said sleeve, and means for rotating said sleeve to rock said disk.

22. In a friction transmission gearing, the combination of a frame, a driving shaft journal bearing therein, a driving shaft journaled in said bearing, a pair of friction driving wheels splined on said shaft, a disk shaft journal bearing in said frame beneath said driving shaft journal bearing and at right angles thereto, a disk shaft in said disk shaft journal bearing, a hollow disk shaft in which one end of said disk shaft fits, a pair of annular friction disks, one on each side of said driving shaft each having a hollow hub surrounding the disk shaft and being adapted to contact with said wheels, its axis making an angle therewith, a universal joint connecting one of said hollow hubs and said shaft and the other hub with said hollow shaft, a ball bearing cone in the central opening of each of said disks, bearing balls for said cone forming a ball bearing connection with the disk, a sleeve formed on said cone and surrounding said shaft, said disk shaft journal bearing having a tubular portion at each end for receiving said sleeve and an arm on said sleeve for rotating the same.

23. In a friction transmission gearing, the combination of a frame, a driving shaft journal bearing therein, a driving shaft journaled in said bearing, a pair of friction driving wheels splined on said shaft, a disk shaft journal bearing in said frame beneath said driving shaft journal bearing and at right angles thereto, a disk shaft in said disk shaft journal bearing, a hollow disk shaft in which one end of said disk shaft fits, a pair of annular friction disks one on each side of said driving shaft each having a hollow hub surrounding the disk shaft and making an angle therewith, said disks being adapted to contact with said wheels, a ball member on the shaft, a socket member being formed on the end of the hub forming a ball and socket connection between the hub and the shaft, engaging gear teeth being formed on said socket and said ball member, a like ball and socket connection between the hub of the other disk and the hollow shaft, a ball bearing cone in the central opening of each of said disks, bearing balls for said cone forming a ball bearing connection with the disk, a sleeve formed on said cone and surrounding said shaft, said disk shaft journal bearing having a tubular portion at each end for receiving said sleeve and an arm on said sleeve for rotating the same.

24. In a friction transmission gearing, the combination of a frame, a driving shaft journal bearing therein, a driving shaft journaled in said bearing, a pair of friction driving wheels splined on said shaft, a disk shaft journal bearing in said frame beneath said driving shaft journal bearing and at right angles thereto, a disk shaft in said disk shaft journal bearing, a hollow disk shaft in which one end of said disk shaft fits, a pair of annular friction disks, one on each side of said driving shaft each having a hub thereon and being adapted to contact with said wheels, surrounding the disk shaft, its axis making an angle therewith, a universal joint connecting one of said hollow hubs and said shaft and the other hub with said hollow shaft, a ball bearing cone in the central opening of each of said disks, bearing balls for said cone forming a ball bearing connection with the disk, a sleeve formed on said cone and surrounding said shaft, said disk shaft journal bearing having a tubular portion at each end for receiving said sleeve, an arm on said sleeve for rotating the same, and a tension spring for forcing said disks into contact with said friction wheels.

25. In a friction transmission gearing, the combination of a frame, a driving shaft journal bearing therein, a driving shaft journaled in said bearing, a pair of friction driving wheels splined on said shaft, a disk shaft journal bearing in said frame beneath said driving shaft journal bearing and at right angles thereto, a disk shaft in said disk shaft journal bearing, a hollow disk shaft in which one end of said disk shaft fits, a pair of annular friction disks, one on each side of said driving shaft each having a hollow hub thereon surrounding the disk shaft and being adapted to contact with said wheels, its axis making an angle therewith, a universal joint connecting one of said hollow hubs and said shaft and the other hub with said hollow shaft, a ball bearing cone in the central opening of each of said disks, bearing balls for said cone forming a ball bearing connection with the disk, a sleeve formed on said cone and surrounding said shaft, said disk shaft journal bearing having a tubular portion at each end for receiving said sleeve, an arm on said sleeve for rotating the same, and a tension spring applied to the end of said hollow shaft for forcing said disks into contact with said wheels.

26. In a friction transmission gearing, the combination of a rigid driving shaft and a pair of friction wheels located on the driving shaft, a pair of friction disks one on each side of said wheels and means for moving opposite disks to bring them into contact with opposite wheels at opposite sides of the disk axes.

27. In a friction transmission gearing, the combination of a friction wheel, an annular friction disk adapted to contact with the edge of said wheel having a hollow hub thereon, a disk shaft making an angle with the disk axis, a universal joint connecting the hub with the disk shaft and a bearing support fitting the center of the disk to form a pivoting support therefor.

In witness whereof I have hereunto set my hand this 12th day of June, 1909.

WILSON SPRAGUE.

Witnesses:
S. W. BATES,
ELEANOR W. DENNIS.

Copies of this patent may be obtained for five cents each, by addressing the "Commissioner of Patents, Washington, D. C."